(12) United States Patent
Gupta et al.

(10) Patent No.: US 9,242,880 B2
(45) Date of Patent: *Jan. 26, 2016

(54) STRATEGY FOR ON-SITE IN SITU GENERATION OF OXIDIZING COMPOUNDS AND APPLICATION OF THE OXIDIZING COMPOUND FOR MICROBIAL CONTROL

(75) Inventors: Amit Gupta, Aurora, IL (US); Charles J. Reedy, Chicago, IL (US); Barbara E. Moriarty, Palatine, IL (US); Jeffery M. Atkins, Aurora, IL (US)

(73) Assignee: Nalco Company, Naperville, IL (US)

( * ) Notice: Subject to any disclaimer, the term of this patent is extended or adjusted under 35 U.S.C. 154(b) by 417 days.

This patent is subject to a terminal disclaimer.

(21) Appl. No.: 12/979,806

(22) Filed: Dec. 28, 2010

(65) Prior Publication Data

US 2012/0165407 A1  Jun. 28, 2012

(51) Int. Cl.
*C02F 1/72* (2006.01)

(52) U.S. Cl.
CPC ............. *C02F 1/722* (2013.01); *C02F 2303/20* (2013.01)

(58) Field of Classification Search
None
See application file for complete search history.

(56) References Cited

U.S. PATENT DOCUMENTS

| | | | |
|---|---|---|---|
| 3,254,952 A | | 6/1966 | Raleigh et al. |
| 3,741,903 A | * | 6/1973 | Evans ............................ 510/306 |
| 3,765,226 A | | 10/1973 | Strickland et al. |
| 4,362,630 A | | 12/1982 | Young |
| 5,045,222 A | | 9/1991 | Endo et al. |
| 5,785,867 A | | 7/1998 | Lazonby et al. |
| 5,976,386 A | | 11/1999 | Barak et al. |
| 6,110,387 A | | 8/2000 | Choudhury et al. |
| 6,329,165 B1 | | 12/2001 | Chattoraj et al. |
| 6,369,288 B1 | | 4/2002 | Brown et al. |
| 6,387,238 B1 | | 5/2002 | Merk et al. |
| 6,733,654 B1 | | 5/2004 | Itzhak et al. |
| 7,012,154 B2 | | 3/2006 | Vineyard et al. |
| 7,271,137 B2 | | 9/2007 | Tucker et al. |
| 8,668,779 B2 | | 3/2014 | Cooper et al. |
| 2003/0203827 A1 | | 10/2003 | Cooper et al. |
| 2005/0109981 A1 | | 5/2005 | Tucker et al. |
| 2006/0025627 A1 | | 2/2006 | Vineyard et al. |
| 2006/0287208 A1 | * | 12/2006 | Lee et al. ...................... 510/175 |
| 2009/0175956 A1 | | 7/2009 | Buschmann et al. |
| 2009/0311164 A1 | | 12/2009 | Gupta et al. |

FOREIGN PATENT DOCUMENTS

| | | |
|---|---|---|
| WO | 94/18297 | 8/1994 |
| WO | WO9418297 A1 | 8/1994 |
| WO | WO 0069778 A1 * | 11/2000 |
| WO | WO2012-092232 A2 | 7/2012 |
| WO | WO2012092232 A3 | 7/2012 |

* cited by examiner

*Primary Examiner* — Susan Tran
*Assistant Examiner* — Jessica Worsham
(74) *Attorney, Agent, or Firm* — Leydig, Voit & Mayer, Ltd.

(57) ABSTRACT

The invention provides a method of controlling biological fouling of water containing items. The method involves combining at least two reactants, a peroxygen source and an acyl group donor to form peracetic acid. Because the peracetic acid can be made in situ, the entire sum of its short lifespan can be used controlling biocidal fouling and storage and transport is simplified. The invention further facilitates the ease of controlling biocidal fouling by allowing the injection of the biocidal agent in liquid form, in a non-acidic environment, and without the need for any halogen. This allows the inventive biocide to be used with chemistries for which prior art biocides are inapplicable.

19 Claims, No Drawings

STRATEGY FOR ON-SITE IN SITU GENERATION OF OXIDIZING COMPOUNDS AND APPLICATION OF THE OXIDIZING COMPOUND FOR MICROBIAL CONTROL

CROSS-REFERENCE TO RELATED APPLICATIONS

None.

STATEMENT REGARDING FEDERALLY SPONSORED RESEARCH OR DEVELOPMENT

Not Applicable.

BACKGROUND OF THE INVENTION

This invention relates to the on-site in situ production of stable peracetic acid for use as a biocidal control agent. Biocidal agents are used to limit or prevent biological fouling in liquid systems or on the surfaces of equipment that come in contact with the liquid systems. In the absence of such agent, biologically fouled liquid systems suffer with unwanted process interferences and inefficiencies. In addition biologically fouled liquid systems may lead to product contamination and various health hazards.

Fouling generally refers to the presence of unwanted organic or inorganic material in the suspended water phase (bulk water) or the accumulation of such unwanted material deposits on various surfaces that come in contact with the liquid system. Fouling can be mineral (such as particulate scale accumulation) and/or biological (microbial contamination) in nature. Fouling occurs by a variety of mechanisms including deposition of air-borne and water-borne and water-formed contaminants, water stagnation, process leaks, and other factors. In some cases mineral fouling can induce biological fouling and vice versa.

Some sources of microbial contamination in industrial liquid systems include, but are not limited to, air-borne contamination, water make-up, process leaks and improperly cleaned equipment. Under these conditions, microorganisms can rapidly establish microbial communities on any wetted or semi-wetted surface of the liquid system. Once these microbial populations are present in the bulk water more than 99% of the microbes present in the water will be present on the surface in the form of biofilms.

Exopolymeric substances secreted from the microorganisms aid in the formation of biofilms as the microbial communities develop on the surface. These biofilms are complex ecosystems that establish a means for concentrating nutrients and offer protection for growth. Biofilms can accelerate scale, corrosion, and other fouling processes. Not only do biofilms contribute to reduction of system efficiencies, but they also provide an excellent environment for microbial proliferation that can include pathogenic bacteria. It is therefore important that biofilms and other fouling processes be reduced to the greatest extent possible to maximize process efficiency and minimize the health-related risks from water-borne pathogens.

Several factors contribute to the problem of biological fouling and govern its extent. Water temperature, water pH, organic and inorganic nutrients, growth conditions such as aerobic or anaerobic conditions, and in some cases the presence or absence of sunlight, etc. can play an important role. These factors also help in deciding what types of microorganisms might be present in the water system.

A number of prior art attempts have been made to control biological fouling in industrial processes. The most commonly used method is the application of biocidal compounds to the process waters. Many of these prior art attempts make use of halogen based and in particular, chlorine-based compositions of matter. Some examples include U.S. Pat. Nos. 5,976,386 and 3,254,952 and US Published Patent Application 2009/0311164. However for various reasons it is desirable to avoid the use of halogens in biocidal agents. Halogens tend to conduct unwanted side reaction with other chemicals in the process waters thereby limiting the efficacy of the biocidal application and that of the applied chemical with which the halogen reacts. Also, halogen based biocides can form disinfection by-products such as AOX (adsorbable organic halide) and THMs (trihalomethanes) and in some cases cause health concerns. Finally, halogen based chemistries raise several environmental concerns due to their high reactivity and formation of disinfection by-products.

Thus there is a clear need and utility for an improved biocidal agent. The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of microbial fouling control. The method comprises the steps of forming a biocidal agent comprising peracetic acid by generating peracetic acid and introducing the biocidal agent into a system susceptible to biological fouling. The peracetic acid may be generated by the reaction of at least two reactants, a peroxygen source and an acyl group donor. The peroxygen source may be one item or a combination selected from the list consisting of: hydrogen peroxide, percarbonate salts, persulfate salts, perborate salts, permanganate salts, carbamide peroxide, and alkyl peroxides such as tert-butyl hydroperoxide, potassium monopersulfate, and any combination thereof.

At least one embodiment of the invention is directed towards the method in which the acyl group donor is an N-acyl, O-acyl, or S-acyl compound, triacetylethanolamine (TAEA), tetraacetylethylenediamine (TAED), acetylsalicylic acid, pentaacetylglucose, acetyl imidazole, acetyl CoA and any combination thereof. The in situ reaction may occur in a pH of between 4 and 11 and most preferable between 5 and 8. The acyl group donor may be used as a single entity or may contain at least one item selected from the list consisting of: pH stabilizers, buffering agents, chelants, surfactants, dispersants, emulsifiers, salts, freezing point depressants, and any combination thereof. The reaction products may be introduced into an industrial process water stream or may be generated in situ within the industrial process water stream and the reaction products may remain within the industrial process water stream for the entire lifespan of the peracetic acid. At least one of the reactants may be introduced in a liquid medium.

At least one embodiment of the invention is directed towards the method in which the biocidal agent is non-halogenated (and/or 100% chlorine free). The biocidal agent may further comprise at least one item selected from the list consisting of: pH stabilizers, buffering agents, chelants, surfactants, dispersants, emulsifiers, salts, freezing point depressants, and any combination thereof. The industrial process water stream may comprise a main branch and a side branch through which a portion of the industrial process water is diverted and then returned to the main branch, wherein at least one of the reactants or the reaction product (peracetic acid) is added to the side branch. In at least one embodiment prior to the addition of at least one reactant, the water in the side branch passes through an apparatus selected from the list consisting of: a water clarifier, a water softener, a chemical or non-chemical microbial control device, an on-line centrifuge, or a water filter. In at least one embodiment the industrial process water stream comprises a monitor and a feeding mechanism, the monitor constructed and arranged to measure physical characteristics of the water process system and to output signals in response thereto, the feeding mechanism constructed and arranged to receive the signals and to appropriately increase, decrease, or halt the flow of reactant into the industrial process water stream in response to the signals to optimally control biological fouling.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

For purposes of this application the definition of these terms is as follows:

"Dispersion" means a fluid system comprising a solid or fluid dispersed phase, which is substantially dispersed within a liquid dispersion medium, dispersion includes but is not limited to solutions, suspensions, emulsions, azeotropes, and colloids.

"Essentially in the absence of" means that a particular material, if present at all in a particular chemical reaction, is present in that chemical reaction in an amount no greater than a trace amount, and its presence accounts for substantially none of the chemical reaction.

"Fouling" means the undesirable presence of or deposition of any organic or inorganic material in the water or on a surface.

"Liquid system" means flood waters or an environment within at least one artificial artifact, containing a substantial amount of liquid that is capable of undergoing biological fouling, it includes but is not limited to industrial liquid systems, industrial water systems, liquid process streams, industrial liquid process streams, industrial process water systems, process water applications, process waters, utility waters, water used in manufacturing, water used in industrial services, aqueous liquid streams, liquid streams containing two or more liquid phases, and any combination thereof.

"Monitor" means a device constructed and arranged to measure at least one physical or chemical characteristic and to output a signal or display in response to that measurement.

"Peroxygen producing chemical" means a composition of matter that contains two or more oxygen atoms in the form of an oxygen-oxygen bond and that induce a higher oxidation state in another composition of matter, peroxygen producing chemical includes but is not limited to: hydrogen peroxide, percarbonate salts, persulfate salts, perborate salts, permanganate salts, carbamide peroxide, and alkyl peroxides such as tert-butyl hydroperoxide and potassium monopersulfate.

"Primary Determinant" means a reactant in a chemical reaction whose presence is not necessary for the reaction to occur but whose presence results in a dramatic (more than 50%) increase in the reaction rate and/or yield.

"TAED" means tetraacetylethylenediamine.
"TAEA" means triacetylethanolamine.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology,* 5th Edition, (2005), (Published by Wiley, John & Sons, Inc.) this definition shall control how the term is to be defined in the claims.

In at least one embodiment, a peracetic acid containing biocide is generated in situ within a volume and added to an industrial process system volume susceptible to biofouling. The peracetic acid is generated by the reaction within the volume of a peroxygen source with an activator. In at least one embodiment the peroxygen source is one item selected from the list consisting of hydrogen peroxide, percarbonate salts, persulfate salts, perborate salts, permanganate salts, carbamide peroxide, and alkyl peroxides such as tert-butyl hydroperoxide and potassium monopersulfate.

In at least one embodiment, the activator is an acyl compound. In at least one embodiment the acyl compound is an N-acyl, O-acyl, or S-acyl compound, TAEA, TAED, acetylsalicylic acid, pentaacetylglucose, acetyl imidazole, acetyl CoA, and any combination thereof. The acyl compound functions as an acyl donor which reacts with the peroxygen source to form peracetic acid. In prior art such as U.S. Pat. No. 5,045,222 TAEA is described as useful in laundry applications. In international patent application WO 94/18297 TAED is described as useful in laundry applications.

In at least one embodiment, the formation of the peracetic acid occurs within a pH range of between 5 and 8. In at least one embodiment, a pH adjusting and/or buffering agent is used to maintain the pH within this range. The solution pH impacts both the formation and self-decomposition of peracetic acid. Alkaline conditions favor rapid formation and self-decomposition. Conversely acidic conditions hinder formation and self-decomposition. A balance must be achieved to both rapidly form peracetic acid and hinder its self-decomposition. In the disclosed invention, the buffering agent aids in the peracetic acid formation. As the peracetic acid is formed, the pH of the solution decreases to a value between 5 and 7. The lower pH inhibits peracetic acid self-decomposition.

Peracetic acid is known as an ideal biocidal agent because it has a high oxidizing potential, it is not deactivated by catalase and similar enzymes unlike hydrogen peroxide, and it breaks down into environmentally friendly residues (acetic acid and hydrogen peroxide). Peracetic acid however has a relatively short shelf life under certain pH conditions. After 10 hours or so, peracetic acid degrades and its usefulness as a biocidal agent is limited. The commercially available peracetic acid products exist as an equilibrium mixture with hydrogen peroxide and acetic acid in the presence of stabilizers and acid catalysts, such as sulfuric acid, in order to stabilize and improve the composition's shelf life. However, the composition of equilibrium PAA presents several other issues upon application, such as those of safety, handling, odor, and corrosivity. As a result, the ability to generate peracetic acid in situ greatly aids in the logistics and effectiveness of a peracetic acid based biocidal agent. Furthermore, in situ generation allows the peracetic acid to be applied effectively to a site for up to its entire lifespan.

This ability of peroxygen sources to generate biocides in situ under standard conditions is quite unexpected when one looks at previous uses of peroxygen sources. Peroxygen sources such as hydrogen peroxide are commonly used as biocides but are required at higher concentrations for effectiveness. In addition, peroxygen sources are commonly used in laundry detergent formulations as a more versatile alternative to chlorine bleaches. In such applications, peroxygen sources are often used with additives such as TAED (tetraacetylethylenediamine) and NOBS (nonanoyloxybenzene sulfonate) to facilitate the production and efficacy of bleaching agents. In the laundry context they are only expected to function in an alkaline environment of at least pH 9.

The inventive method is also superior to prior art methods of generating peracetic acid such as that of U.S. Pat. No. 7,012,154 and US Published Application 2006/0025627 A1. In the prior art methods, peracetic acid is generated by reacting acetic acid with hydrogen peroxide and a strong acid catalyst. This reaction is unsatisfactory because the reaction rate is slow, the formed peracetic acid degrades and the only way to obtain an effective amount of peracetic acid is to flood the system with acetic acid. This is wasteful, and introduces unwanted compositions into the process water that can cause unwanted side reactions.

In U.S. Pat. Nos. 6,369,288 and 7,271,137 and US Published Patent Application 2005/0109981 there is described a multipart disinfection system. Two formulas are described within these documents. Both formulas rely upon the use of a highly reactive intermediate peroxide species (hydroperoxycarbonate, $HCO_4^-$), generated by mixing hydrogen peroxide with a carbonate base (the peroxide activator) in water. A separate buffered solution may be used in conjunction to provide proper pH control. These prior art references teach that the hydroperoxycarbonate species is generated in the presence of a cationic surfactant (e.g. benzylalkonium chloride) and the resulting mixture is used as a disinfectant or for decontamination purposes. They also teach that the hydroperoxycarbonate species is generated and used with an O-acyl bleaching activator (e.g. diacetyl glycerol or propylene glycol acetate) to form peracetic acid.

The current invention is superior to the multipart disinfection system for numerous reasons. Its versatility allows users to avoid the need for multiple chemical feedstocks. The invention can be supplied by adding contents from only 2 chemical storage containers into the target object. These prior art systems require storage of the chemical solutions in up to four different containers, in order to prevent degradation of the active chemicals, and may require the use of solubilizing agents or surfactants to improve the performance of the disinfectant. In at least one embodiment of the current invention the system is not reliant upon the use of a highly reactive hydroperoxycarbonate species to generate peracetic acid.

In at least one embodiment the invention in particular is distinct from and different from the chemistries used in laundry applications. In at least one embodiment the generated peracetic acid is a dispersion. Peracetic acid generation from TAED is aided by the use of surfactants. Surfactants help facilitate the dissolution of TAED into water, but the dissolution is slow and this creates a time-release effect for peracetic acid generation. In at least one embodiment the acyl group donor is water soluble. Laundry applications are carried out in high pH environments (9-11) to facilitate bleaching of textile materials. The solution pH impacts both the formation and self-decomposition of peracetic acid. Alkaline conditions favor rapid formation and self-decomposition. Conversely acidic conditions hinder formation and self-decomposition. In contrast the invention operates in a lower range (4-11 and preferably 5-8). The lower pH range works to stabilize the peracetic acid. Laundry applications are single container reactions and do not have the same runability and application issues issues as industrial systems, so a solid such as TAED is acceptable. In at least one embodiment the invention utilizes TAEA which is a liquid and utilizes surfactants to allow the chemistry to flow through a complex system or apparatus. Laundry applications are of short duration (15-45 minutes) because longer can damage the textiles and in many cases because the textiles cannot get any cleaner with more time. Laundry applications are single container applications where solid chemistries are easily applied as part of a solid detergent formulation. There is however a lack of commercially available technology where in situ production of peracetic acid is conducted in the liquid state using liquid precursors. In at least one embodiment the peracetic acid solution generated is stable on the order of hours to days. In laundry applications a carbonate material (such as sodium carbonate) is the primary determinant of the acid yield. In at least one embodiment the maintaining of the pH at a level which stabilizes the generated peracetic acid is the primary determinant of yield. If the pH gets too high the peracetic acid breaks down dramatically reducing yield and if the pH is too low the reaction rate slows dramatically reducing yield. Within at least one embodiment the pH range inhibits peracetic acid self-decomposition.

In at least one embodiment, the peracetic acid is generated in the presence of a suitable organic or inorganic base. In at least one embodiment the base is one selected form the list consisting of: imidazole, 1-methylimidazole, benzotriazole, triethylamine, diisopropylethylamine, morpholine, pyridine or its derivatives such as 2,6-lutidine and dipyridyl; carbonate, bicarbonate, phosphate (dibasic or tribasic) ions, acylated amines such as 1-acetylimidazole, or 1-acetylindole, and any combination thereof. In at least one embodiment the acylated amines functions both as a base and as a peracetic acid activator. In at least one embodiment imidazole and/or benzotriazole function both as bases and reduce corrosion in the industrial system they are placed within.

In at least one embodiment the biocidal agent further comprises one item selected from the list consisting of: surfactants, chelants, dispersants, emulsifiers, salts, freezing point depressants, and any combination thereof.

In at least one embodiment, a side stream of the process water is diverted, the biocidal agent is added to the side stream, and the side stream is re-introduced to the process water stream. In at least one embodiment, the side stream is run through a water conditioning system, such as a clarifier or a filtration system, before the biocidal agent is added. In at least one embodiment a monitoring system is present in the water process system which measures physical or chemical characteristics indicating changes in biocide concentrations, degree of biofouling, flow rate, and the like, and any combination thereof. Embodiments of this invention include using the inventive biocidal agents according to the biocide addition and monitoring strategies, equipment, and techniques described in U.S. Pat. Nos. 3,765,226, 6,733,654, 6,110,387, and 4,362,630. In at least one embodiment this technology would be applicable to any process or utility liquid system where microorganisms are known to grow and are an issue, and biocides are added. Examples of some industrial process water systems where the method of this invention could be applied are in process water applications (flume water, shower water, washers, thermal processing waters, brewing, fermentation, CIP (clean in place), hard surface sanitization, etc), Ethanol/Bio-fuels process waters, pretreatment and utility waters (membrane systems, ion-exchange beds), water used in the process/manufacture of paper, ceiling tiles, fiber board, microelectronics, E-coat or electrodeposition applications, process cleaning, oil exploration and energy services (completion and workover fluids, drilling additive fluids, fracturing fluids, flood waters, etc; oil fields—oil and gas wells/flowline, water systems, gas systems, etc), and in particular water systems where the installed process equipment exhibits lowered compatibility to halogenated biocides.

In at least one embodiment, the mechanism feeding the biocidal agents and or its constituents are automated and are constructed and arranged to appropriately feed or cut off the feed of materials into the water process stream in response to receiving signals from the monitors. In at least one embodiment the inventive biocidal agents are fed according to the strategies, equipment, and techniques described in U.S. Pat. No. 6,329,165. In at least one embodiment the applied biocidal dosage is determined according to oxidation-reduction potential (ORP) techniques. In at least one embodiment, the rate of biofouling is known and the feed rate of biocidal agent is timed to be optimal against that rate. Such embodiments are particularly effective when the particular species or ecology of the biological contaminant is identified and the growth rate is known for the given environment.

In at least one embodiment the system into which the biocidal agent is introduced is a system which excludes laundry washing, laundry bleaching, textile washing, and/or textile bleaching systems. In at least one embodiment the systems contemplated into which the biocidal agent is introduced includes laundry washing, laundry bleaching, textile washing, and/or textile bleaching systems.

EXAMPLES

The foregoing may be better understood by reference to the following example, which is presented for purposes of illustration and is not intended to limit the scope of the invention.

Table 1 demonstrates that the yield of peracetic acid from the combination of a hydrogen peroxide peroxygen source with a TAEA activator is unexpectedly high. The table indicates how much of a molar excess of hydrogen peroxide per mol of TAEA activator is required to produce the best yields. The yield % reflects the percentage of acetyl source converted into peracetic acid. The reaction was performed in the presence of various amounts of acetylimidazole.

TABLE 1

Blending ratios for reaction and corresponding peracetic acid yield.

| Acetyl imidazole wt % | Molar excess of hydrogen peroxide | Peracetic acid yield |
|---|---|---|
| 0.0% | 0.99 | 7% |
| 0.0% | 2.31 | 8% |
| 1.0% | 1.00 | 22% |
| 3.1% | 0.96 | 53% |
| 5.1% | 1.40 | 48% |
| 6.1% | 1.84 | 81% |
| 7.1% | 2.72 | 95% |
| 8.1% | 2.68 | 96% |

While this invention may be embodied in many different forms, these are shown in the drawings and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of microbial fouling control of a liquid system susceptible to biological fouling, wherein the liquid system comprises an industrial process water stream the method comprising generating a biocidal agent comprising peracetic acid by reacting a peroxygen source and triacetylethanolamine in the presence of 1-acetyl imidazole at a pH of from about 5 to about 8;
wherein the peroxygen source is selected from the group consisting of: hydrogen peroxide, a percarbonate salt, a perborate salt, a permanganate salt, a peroxysilicate, carbamide peroxide, urea hydrogen peroxide, an organic peroxide, tert-butyl hydroperoxide, and combinations thereof wherein the reaction occurs within the industrial process water stream.

2. The method of claim 1, wherein the reaction occurs at a pH of from about 5 to about 6.

3. The method of claim 1, wherein the biocidal agent is within the industrial process water stream for the entire lifespan of the peracetic acid.

4. The method of claim 1, wherein the industrial process water stream comprises a component selected from the group consisting of: flume water; shower water; thermal processing water; a brewing liquid; a fermentation liquid; a clean in place liquid; a hard surface sanitization liquid; ethanol/bio-fuel process water; pretreatment water; utility water; a membrane system liquid; an ion-exchange bed liquid; water used to manufacture paper, ceiling tiles, fiber board, or microelectronics; an E-coat liquid; an electrodeposition liquid; a process cleaning liquid; an oil exploration services liquid; an oil well completion fluid; an oil well workover fluid; a drilling additive fluid; an oil fracturing fluid; an oil well flowline water system; a gas well flowline water system; a natural gas water system; and combinations thereof.

5. The method of claim 1, wherein the biocidal agent further comprises at least one item selected from the group consisting of: a surfactant, a chelant, a dispersant, an emulsifier, a salt, a freezing point depressant, and combinations thereof.

6. The method of claim 1, wherein the industrial process water stream comprises a main stream and a side stream through which a portion of the industrial process water is diverted and then returned to the main stream, wherein the biocidal agent is added to the side stream.

7. The method of claim 6, wherein, prior to the addition of the biocidal agent, the side stream passes through an apparatus selected from the group consisting of: a water clarifier, a water softener, an on-line centrifuge, a water filter, and combinations thereof.

8. The method of claim 1, further comprising monitoring the industrial process water stream to control the generation of the biocidal agent.

9. The method of claim 1, wherein the liquid system comprises process equipment constructed of a material that is less compatible with halogenated biocides than with non-halogenated biocides.

10. The method of claim 1, wherein the generated peracetic acid remains stable for about two to about ten hours.

11. The method of claim 1, wherein the peroxygen source, triacetylethanolamine, and the 1-acetyl imidazole are liquids prior to being reacted.

12. A method of microbial fouling control of a liquid system susceptible to biological fouling, wherein the liquid system comprises an industrial process water stream the method consisting essentially of generating a biocidal agent by reacting a peroxygen source and triacetylethanolamine in the presence of 1-acetyl imidazole at a pH of from about 5 to about 8, and introducing the biocidal agent into the liquid system;

wherein the peroxygen source is selected from the group consisting of: hydrogen peroxide, a percarbonate salt, a perborate salt, a permanganate salt, a peroxysilicate, carbamide peroxide, urea hydrogen peroxide, an organic peroxide, tert-butyl hydroperoxide, and combinations thereof wherein the reaction occurs within the industrial process water stream.

13. The method of claim 12, wherein the reaction occurs at a pH of from about 5 to about 6.

14. The method of claim 12, wherein the reaction occurs at a pH of from about 5 to 6.

15. The method of claim 1, wherein the reaction occurs at a pH of from about 5 to 6.

16. The method of claim 1, wherein the peroxygen source is hydrogen peroxide.

17. The method of claim 12, wherein the peroxygen source is hydrogen peroxide.

18. The method of claim 14, wherein the peroxygen source is hydrogen peroxide.

19. The method of claim 15, wherein the peroxygen source is hydrogen peroxide.

\* \* \* \* \*